(12) United States Patent
Dakhil

(10) Patent No.: US 6,370,596 B1
(45) Date of Patent: Apr. 9, 2002

(54) LOGIC FLAG REGISTERS FOR MONITORING PROCESSING SYSTEM EVENTS

(75) Inventor: Dani Y. Dakhil, Campbell, CA (US)

(73) Assignee: Chameleon Systems, Inc., Sunnyvale, CA (US)

(*) Notice: Subject to any disclaimer, the term of this patent is extended or adjusted under 35 U.S.C. 154(b) by 0 days.

(21) Appl. No.: 09/365,886

(22) Filed: Aug. 3, 1999

(51) Int. Cl.[7] .............................................. G06F 13/00
(52) U.S. Cl. ......................... 710/15; 710/25; 709/102; 712/219
(58) Field of Search ................................ 709/102–105; 710/15–19, 22–28; 712/216–219; 711/163–169

(56) References Cited

U.S. PATENT DOCUMENTS

| | | | | |
|---|---|---|---|---|
| 5,057,998 A | * | 10/1991 | Hirokawa | 709/213 |
| 5,193,195 A | * | 3/1993 | Miyazaki | 710/262 |
| 5,528,767 A | * | 6/1996 | Chen | 710/113 |
| 5,581,771 A | * | 12/1996 | Osakabe | 710/265 |
| 5,632,023 A | * | 5/1997 | White et al. | 712/218 |
| 5,748,984 A | * | 5/1998 | Sugita | 710/69 |
| 5,850,530 A | * | 12/1998 | Chen et al. | 710/113 |
| 6,233,663 B1 | * | 5/2001 | Yamamoto et al. | 711/165 |
| 6,298,394 B1 | * | 10/2001 | Edwards et al. | 710/15 |

* cited by examiner

*Primary Examiner*—Christopher B. Shin
(74) *Attorney, Agent, or Firm*—Burns Doane Swecker & Mathis LLP

(57) ABSTRACT

A system and method of detecting events such as DMA requests, computation operations, configuration set-up operations, occurring in a processing system which are performed by functional system blocks within the system by using logic flags stored in registers within each of the functional system blocks. The registers are coupled to the CPU on dedicated signal lines. Each time a functional block completes an operation or function it updates its corresponding logic flag. The CPU monitors the state of the flags to determine whether certain events have taken place in the system in order to sequentially coordinate functions and operations within the system without the use of interrupt signals on the system bus.

13 Claims, 3 Drawing Sheets

| Field | Bits | Description | Reset | Type |
|---|---|---|---|---|
| RESERVED | 31:6 | Reserved, Read as 0 | 0 | R |
| DMADONE3 | 5 | DMA 3 completed | 0 | RW1C |
| DMADONE2 | 4 | DMA 2 completed | 0 | RW1C |
| DMADONE1 | 3 | DMA 1 completed | 0 | RW1C |
| DMADONE0 | 2 | DMA 0 completed | 0 | RW1C |
| CNFGLD | 1 | Requested configuration loaded | 0 | RW1C |
| SLCDONE | 0 | Computation in slice completed | 0 | RW1C |

LOGIC FLAG REGISTERS FOR MONITORING PROCESSING SYSTEM EVENTS

BACKGROUND OF THE INVENTION

1. Field of the Invention

The present invention relates to the technique of monitoring events occurring within a processing system, and particularly techniques in which a central processing unit (CPU) within a processing system monitors events within the processing system so as to sequentially coordinate functions being performed within the processing system.

2. State of the Art

In general, a processing or computing system includes several functional system blocks each for performing a certain function or functions within the system. For instance, processing systems often include a data processing unit for processing data loaded into a memory buffer area, a DMA controller for managing direct memory accesses, and/or a memory controller for managing memory accesses between a larger off-chip memory and a smaller on-chip buffer area. Each of these functional elements perform their corresponding functions as instructed by the system's central processing unit (CPU). Generally, the CPU instructs the functional elements to perform their functions in a particular order so as to implement a given operation with the processing system. For instance, in order to process a block of data, the CPU may 1) initiate a first DMA request that moves a block of data from a first memory area to a second memory, 2) configure a data processing unit into a certain configuration to perform a particular function on the block of data, 3) instruct the configured data processing unit to process the block of data requested in the first DMA request, and 4) initiate a second DMA request to store the processed block of data back to the first memory area. In this example, the above steps have to be performed in a given consecutive order, each being completed prior to starting the next step. For instance, the first step (i.e., the DMA request which moves the data from the first memory area to the second) must be completed prior to the third step (i.e., data processing). In addition, the second step (i.e., configuring the data processing unit) also needs to occur prior to the third step. Finally, all of steps 1)–3) need to be completed prior to the fourth step (i.e., storing the processed data back into the first memory).

In the past, in order to let the CPU know when a given event, function, or step (as described above) is completed so that the CPU can initiate a next step of an operation, the functional element which had just completed its function interrupts the CPU by transmitting an interrupt signal on the system bus to the CPU. The CPU then stops what it is currently operating on and services the interrupt signal by performing some function that is related to the event that initiated the interrupt. For instance, if a data processing unit finishes processing a block of data, the data processing unit would generate an interrupt to notify the CPU that it is done. The CPU, in turn, interrupts its normal processing sequence to determine what should be done to service the interrupt. The disadvantage of this technique is that interrupts and the associated steps following interrupts generate traffic on the system bus thereby tying up the system bus as well as tying up the CPU.

The objective of the present invention is to avoid the overhead caused when servicing interrupts and in general to provide a manner in which to monitor events within a processing system without using interrupts and without tying up the system bus.

SUMMARY OF THE INVENTION

The present invention is a system and method in which events occurring in a processing system are monitored using logic flags that are stored in logic flag registers. The logic flag registers reside within the functional system blocks in which the events are occurring. As the events occur, the functional system blocks update their logic flag registers. The CPU in the processing system is directly coupled on dedicated signal lines to the logic flag registers allowing the CPU to constantly monitor the state of the flags and to avoid using the system bus of the processing system. In one embodiment, the CPU continuously performs an algorithm loop which reads the flags, until it detects that the state of the flag has changed indicating that the status of the event. The CPU can monitor all flags or only certain flags during specified times.

BRIEF DESCRIPTION OF THE DRAWINGS

The present invention may be further understood from the following written description in junction with the appended drawings. In the drawings.

DETAILED DESCRIPTION OF THE PREFERRED EMBODIMENTS

Figures 1, 3:
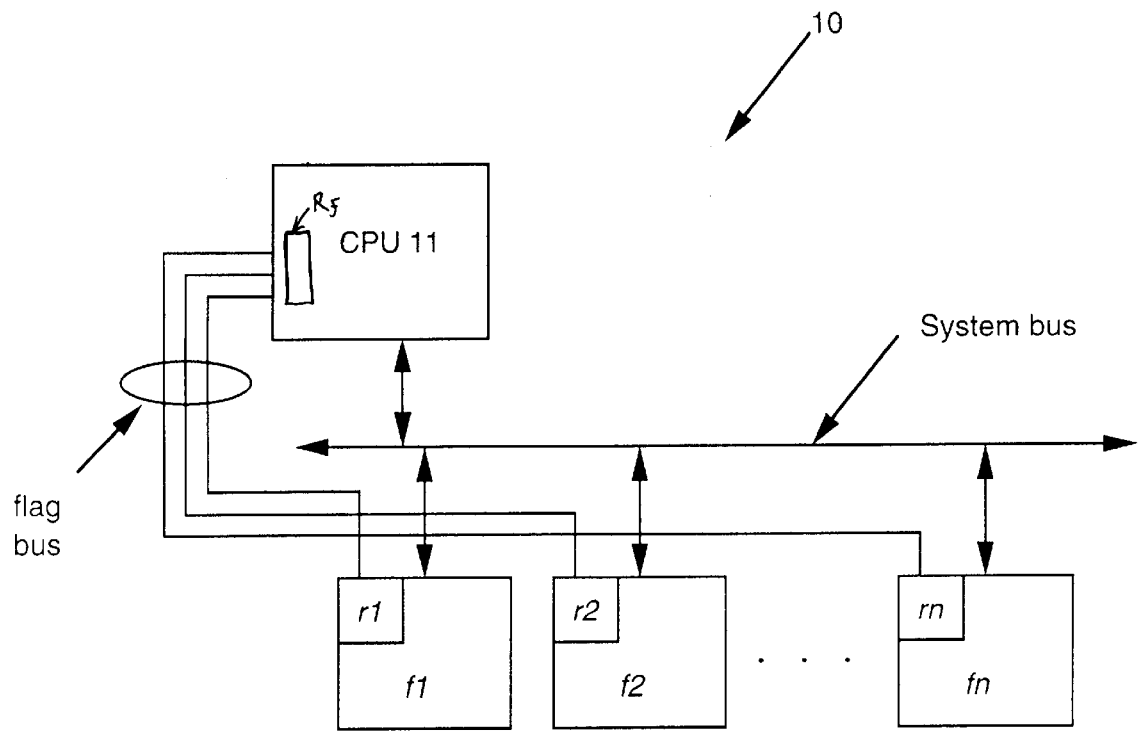
FIG. 1 shows a first processing system utilizing logic flags for monitoring functional event within processing system.
FIG. 3 shows one embodiment of a flag register utilized for monitoring functional events within the system shown in FIG. 2.

FIG. 1 shows a first simplified processing system 10 using flag registers to monitor events within the processing system. The processing system 10 includes a central processing unit (CPU) 11 which controls the overall sequential processing of operations and functions performed by the system, and functional units fl–fn. A system bus couples the CPU and functional units together. The functional units fl–fn represent the elements within processing system 10 which perform certain functions as instructed by the CPU 11 to implement system operations. For instance, these functional units can include a memory controller, a DMA controller, a bus interface, a data processing unit, an arbitration unit, etc.

Each of functional units fl–fn include a flag register rl–rn which comprises at least one flag bit indicating the status of an event performed by the functional unit. For instance, if functional unit fl is a DMA controller, then register rl might be a flag indicating that a given DMA request is complete (flag="0") or is still in progress (flag="1"). Alternatively, if functional unit f2 is a Memory controller, then register r2 might be a flag indicating that a load transaction is complete (flag="0") or is still in progress (flag="1"). The flag registers are coupled to the CPU on the flag register buses 13 to a register Rf within or directly coupled to the CPU. Each single bit field of the register Rf reflects the same state as one of the registers rl–rn. The CPU either continuously monitors all or a portion of the flags in register Rf or intermittently monitors all or a portion of the flags.

Performing event monitoring using the flag registers as shown in FIG. 1 avoids using interrupts in the processing system which add traffic to the system bus and consumes CPU processing cycles. In particular, in prior art techniques, an interrupt signal is transmitted from a functional unit on the system bus to the CPU to indicate that an event has been completed. This interrupt signal is followed by several other signals transmitted by the CPU on the system bus to service the interrupt. In contrast, the technique of the present invention utilizes flag registers to indicate the status of a function event, not interrupt signals. Moreover, the flag registers of the present invention are coupled to the CPU on a dedicated line, separate from the system bus, and the registers are monitored by the CPU to determine functional unit status—instead of the CPU waiting for an interrupt signal to indicate event status as is done in the prior art.

Figure 2:
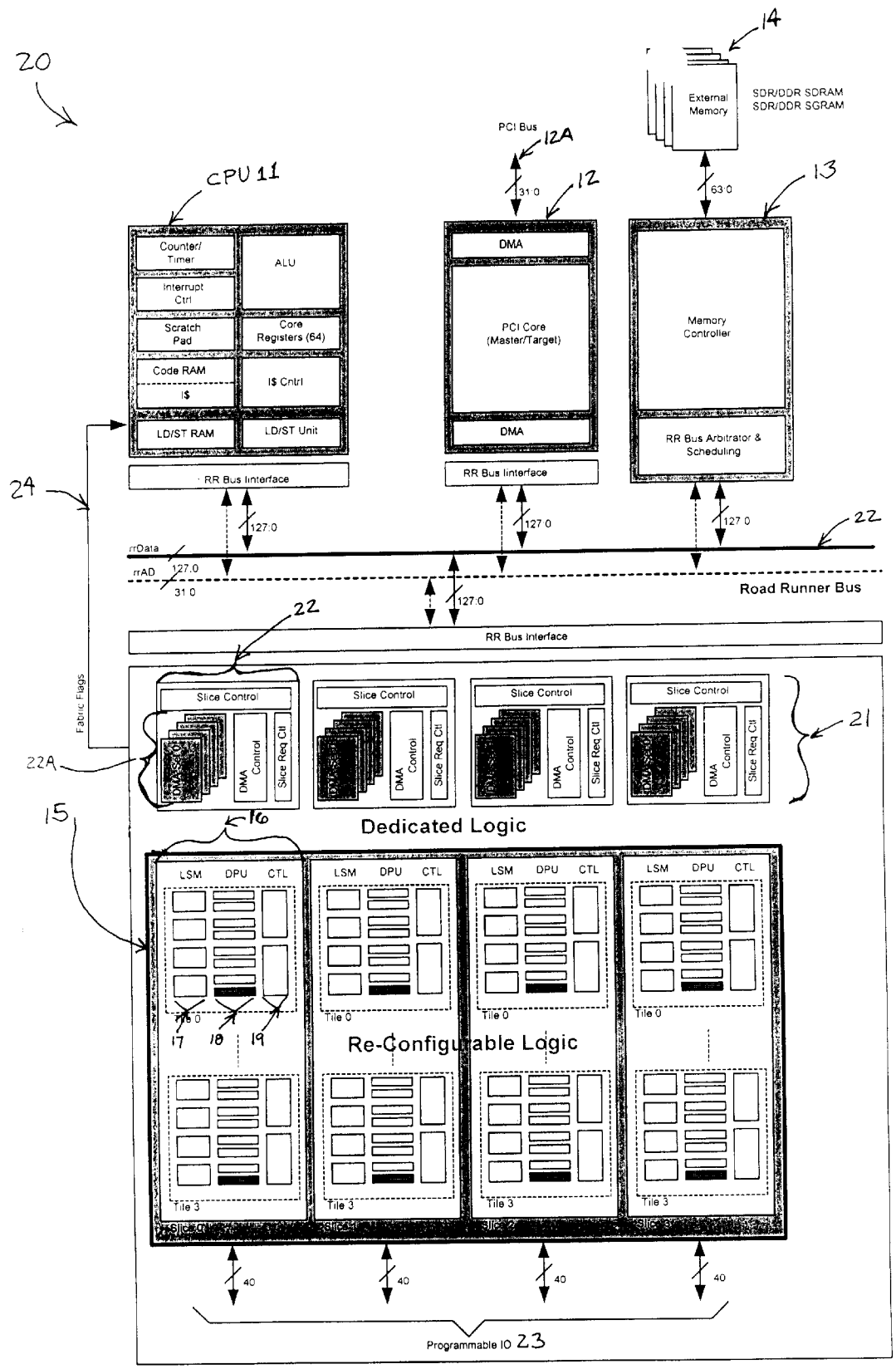
FIG. 2 shows a second processing system utilizing logic flags for monitoring functional events within the processing system.

FIG. 2 shows a second embodiment of a processing system 20 using flag registers to monitor events within the processing system. The processing system includes a central processing unit (CPU) 11 which includes such elements as an arithmetic logic unit (ALU) portion, an interrupt control portion, and other elements well know to system designers, to perform the functions of a typical CPU in a processing system. The processing system further includes a PCI bus controller 12 for interfacing between the processing system 20 and an external device or system (not shown) on PCI bus 12A, and a memory controller 13 for managing memory transactions between an external memory 14 and the processing system 10. In addition system 20 includes a reconfigurable logic portion 15 including four reconfigurable logic slices 16 (slice 0-slice 3) each slice including a reconfigurable memory buffer area portion 17, a reconfigurable data processing unit portion 18 for processing data stored in buffer area 17, and a reconfigurable control portion 19 for providing control in each slice. System 20 further includes a DMA controller portion 21 having four DMA and slice control portions 22 (one per slice), for controlling DMA requests within its corresponding slice and for controlling corresponding slice operations. Finally, programmable I/O 23 provides a means of inputting and outputting data to/from system 20.

Each slice includes a register indicating the status of each of its portions 17–19. In one embodiment, each slice includes a flag bit indicating the following functional events: 1) the completion/non-completion of a DMA request for loading/storing data into/out of memory buffer area portion 17 which was initiated by one of a set of DMA registers 23A, 2) the completion/non-completion of the configuration of memory portion 17 and the configuration of data processing unit portion 18 by the reconfigurable control portion 19, and 3) the completion/non-completion of the processing of data by the data processing unit portion 18 as initiated by the CPU. FIG. 3 shows one embodiment of a slice's flag register for providing the status information for the above events.

The flag register from each slice is coupled on a dedicated flag bus line 24 to corresponding registers (not shown in FIG. 3) within CPU 11. This allows the CPU to continuously or intermittently monitor the status of the flags so as to determine whether to initiate a next sequential function or operation. In one embodiment, the flag registers are monitored by the CPU using an algorithm loop. Since the registers being monitored are within the CPU block 11, the flag signals need not be transmitted over the system bus 22 thereby reducing transmission time of the flag signals. As a result, in one embodiment, flag signal status can be monitored by the CPU block 11 once per cycle.

The following is one embodiment of an algorithm loop for checking the state of the computation flag bit, bit 0, in the flag register shown in FIG. 3:

| | |
|---|---|
| LP: LR r28, [aux-flags-0 reg] | ;load content of [aux_flags_0_reg] into r28 |
| AND.F 0, r28, 1 | ;set Z condition code if bit 0 of aux_flags_0_reg=0 |
| BZ.ND LP | ; branch back to LP Z=0 |
| SR 2, [aux_flags_0_reg] | ; clear bit 0 in aux_flags_0_reg |

According to the above algorithm, initially, the flag register (aux_flags_0_reg) is loaded into a register (r28) within the CPU. Next, bit 0 of the aux_flags_0_reg register which was loaded into r28 is ANDed with "0" and if the resultant is "0" then no flag is set and a zero branch condition occurs (i.e., BZ) and branches back to the beginning of the loop (i.e., LP). Otherwise, if the resultant is equal to "1" (status flag set to "1" indicating completion of the computation) then the Z condition code is set after which, bit 0 is reset back to "0" and the looping continues.

Figure 4:
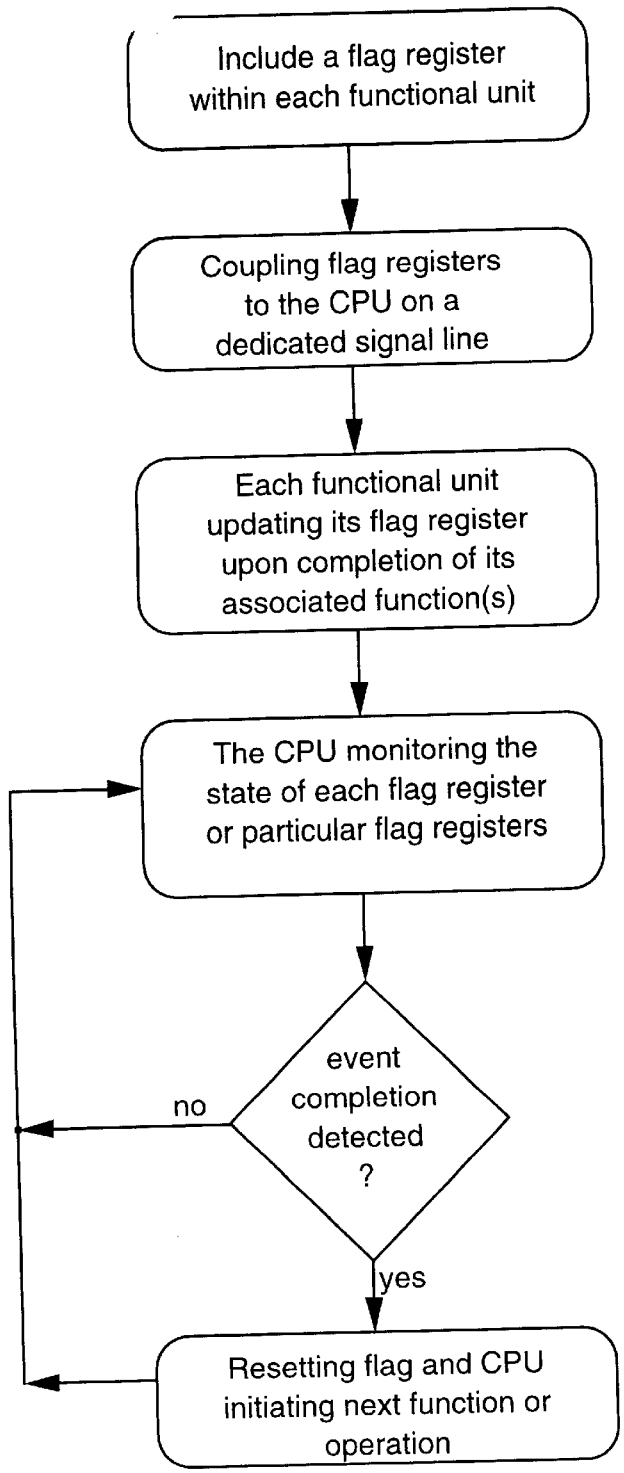
FIG. 4 shows a flow chart illustrating one embodiment of the steps of the method of using flag registers for monitoring functional events within a processing system.

FIG. 4 is a flow chart showing one embodiment of the steps for utilizing flag registers for monitoring events in a processing system. Initially, each functional unit is designed to include a flag register for storing status information indicating the completion/non-completion of the functional unit's function or functions. The flag registers are coupled to the CPU on a dedicated signal line. Each functional unit updates its flag register upon completion of its associated function. The CPU monitors the status of the flag registers to determine when certain operations or functions have been completed. If the CPU detects that a flag register has been set indicating completion of a function event, the register is reset and the CPU initiates a next function dependent on the completion of the previous function. If the CPU does not detect that the flag is reset, it continues to monitor the flag register. Consequently, the flag registers allow the CPU to sequentially coordinate functions and operations within the system without tying up CPU computing cycles and the system bus by servicing interrupt signals.

In one embodiment, certain status flags are monitored contingent on what functions are currently in progress within the system. For instance, if the data processing unit portion 18 is performing a computation operation, the CPU continually monitors the flag bit corresponding to the computation operation (i.e., bit 0, FIG. 3). Once the operation is complete, the CPU stops monitoring the bit 0 flag bit and starts monitoring the flag bit that corresponds to the next operation or function that the CPU initiates. In addition, the CPU may monitor all, a portion of, or none of the flag bits, depending on the current operating state of the processing system.

In the preceding description, numerous specific details are set forth, such as specific functional elements or processing system structure in order to provide a thorough understanding of the present invention. It will be apparent, however, to one skilled in the art that these specific details need not be employed to practice the present invention. In other instances, well known processing system operation and theory have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What I claim is:

1. A processing system comprising:
   a plurality of functional elements, each for performing at least one function, each functional element including at least one flag bit register indicating a status of one of completion and non-completion of said at least one function;
   a central processing unit (CPU) for implementing sequential operations within said system by instructing and coordinating instructions with said plurality of functional elements to perform said sequential operations;
   a dedicated flag bus coupled from each flag bit register to said CPU;
   means for said CPU to monitor said status of said each flag bit register thereby allowing said CPU to initiate and coordinate functions with said plurality of functional elements to perform said sequential operations.

2. The system as described in claim 1 wherein said plurality of functional elements comprises a plurality of reconfigurable circuit slices, each slice including a reconfigurable memory buffer portion, a reconfigurable data processing unit portion, and a reconfigurable control portion, and said each slice having a corresponding flag bit register including:
   a first flag bit indicating said status of a computation operation performed by said reconfigurable data processing unit portion;
   a second flag bit indicating said status of a loading operation of configuration information into said each slice for configuring said reconfigurable memory buffer portion, said reconfigurable data processing unit portion, and said reconfigurable control portion; and
   at least one third flag bit indicating said status of a DMA request for a data transfer operation with said reconfigurable memory buffer portion.

3. The system as described in claim 1 wherein said CPU continuously monitors said status of said at least one flag in said each functional element.

4. The system as descrbied in claim 1 wherein said CPU intermittently monitors said status of said at least one flag in said each functional element.

5. The system as described in claim 1 wherein said CPU continuously monitors said status of said at least one flag in certain ones of said each functional element dependent on current functions initiated by said CPU.

6. The system as described in claim 1 wherein said CPU intermittently monitors said status of said at least one flag in certain ones of said each functional element dependent on current functions initiated by said CPU.

7. The system as described in claim 1 wherein said monitoring means comprises a software algorithm loop.

8. A method of monitoring events within a processing system including a CPU and a plurality of functional elements, said method comprising the steps of:
   including in each functional element at least one status flag bit register indicating a status of a function performed by said each functional element, said status flag bit register including at least one flag bit having a logical state dependent on the status of said function;
   coupling said at least one status flag bit register on a dedicated signal line to said CPU;
   each functional element updating said status flag bit register upon completion of said function;
   said CPU monitoring said logical state of said status flag bit register so as to sequentially coordinate functions performed within said system by said plurality of functional elements dependent on said each functional element's flag bit state.

9. The method as described in claim 8 further comprising a step of resetting said logical state of said at least one flag bit after said step of updating said status flag bit register.

10. The method as described in claim 8 wherein said step of said CPU monitoring said logical state comprises a step of continuously performing a software algorithm loop.

11. The method as described in claim 8 wherein said step of said CPU monitoring said logical state comprises a step of intermittently performing a software algorithm loop.

12. The method as described in claim 8 wherein said step of said CPU monitoring said logical state comprises a step of intermittently monitoring said logical state of a flag bit corresponding to a current function initiated by said CPU.

13. The method as described in claim 8 wherein said step of said CPU monitoring said logical state comprises a step of continuously monitoring said logical state of a flag bit corresponding to a current function initiated by said CPU.

* * * * *